July 13, 1926.

C. BENTHAM

GRAIN CLEANING MACHINE

Filed August 31, 1925

1,592,752

INVENTOR
C. Bentham
By Marks & Clerk
attys

Patented July 13, 1926.

1,592,752

UNITED STATES PATENT OFFICE.

CECIL BENTHAM, OF MANCHESTER, ENGLAND, ASSIGNOR TO HENRY SIMON LIMITED, OF MANCHESTER, ENGLAND, A BRITISH COMPANY.

GRAIN-CLEANING MACHINE.

Application filed August 31, 1925, Serial No. 53,694, and in Great Britain January 24, 1925.

This invention relates to machines for cleaning grain or separating therefrom the dust, chaff and other foreign material or impurities (together with light, damaged, hollow or broken grain) which are usually associated therewith.

Heretofore it has been proposed in connection with a grain cleaning machine to employ a double fan into which the dust and other impurities from the grain are drawn, the said fan dividing the dust laden air into two portions, one portion, which is the main portion, being slightly laden with dust and the other portion which is heavily laden with dust being passed through a dust separator and collector, and the whole of the air being then re-circulated through the grain. With such an arrangement, self-sealing rotary valves have to be provided for controlling the delivery of dust from the separator and collector.

The object of my present invention is to simplify the construction and arrangement of grain cleaning machine of the type before referred to, to obviate the employment of rotary self-sealing type valves on the dust separator with freedom from the emission of dust laden air from the machine, and to obtain a highly efficient cleaning action.

My invention comprises a grain cleaning machine of the type referred to, in which the air from the dust separator and collector is returned to the air circulation circuit at a point between the place where the main air first acts upon the grain and the suction inlet of the double fan.

My invention further comprises the combination with an aspirating device by which the dust, chaff, and other impurities are separated from the grain, and a double fan dividing the air into two portions, one portion being slightly and the other heavily laden with dust, the latter portion being passed through a dust separator and collector, of means causing the grain to be cleaned to pass twice through the air delivered direct from the double fan and at a point intermediate between the said two passages to pass also through the air leaving said dust separator and collector, the whole of the air being continuously circulated through the cleaning machine to and from the double fan.

Referring to the accompanying sheet of explanatory drawings:—

The same reference letters in the three views indicate the same or similar parts.

Figure 2:
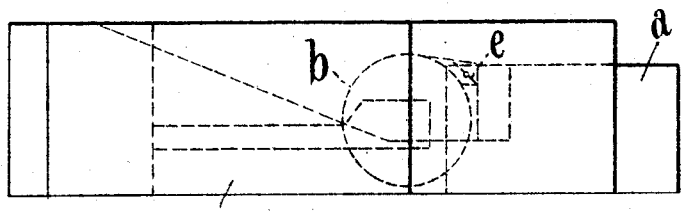

In the illustrated applications of my invention, I employ a double type fan $a$ which in known manner serves to divide the air received by it into two portions, one slightly and one heavily laden with dust, the latter portion being delivered into a dust separator and collector $b$. The former portion is delivered by the pipe $c$ into a conduit $d$ down which the grain is descending, so as to exert a cleaning action on the grain. A valve $e$ (Figure 2) may be arranged between the double fan and the dust separator $b$ and a similar valve $f$ be provided on the air conduit $c$.

Figure 3:
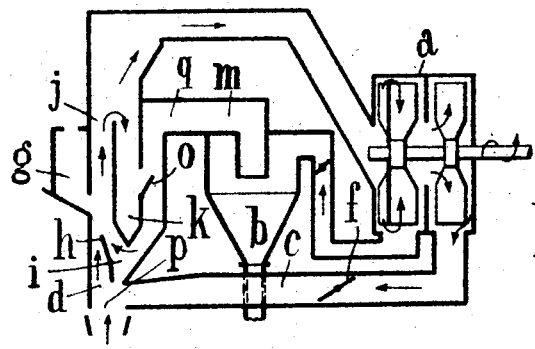
Figure 3 is a diagrammatic illustration of a modified arrangement of plant.

The aforesaid known action of the double fan $a$ is clearly shown at Figure 3. The dust laden air entering from the conduit $j$ (hereinafter referred to) enters the fan casing at its left hand side. The heavily dust laden air owing to its superior specific gravity, is driven by the centrifugal force into the said separator $b$ whilst the air but slightly laden with dust passes, as shown by the arrows, over the periphery of the usual partition disc forming part of the left hand fan and thence to the right hand fan and into the said pipe $c$.

The grain is delivered into the machine at $g$ from one side of the aspirating conduit $d$ up which the cleaning air passes, travels across such conduit or chamber and over a weir plate or the like $h$ into a conduit or branch $i$ into which the air from the dust separator may be delivered as hereinafter described. It then re-enters the aspirating conduit at a lower point as shown, where it is again subjected to the action of the air delivered from $c$ by the double fan device and leaves the machine at $p$.

The light grain which is carried up the conduit $j$ by the ascending air passes over into a side channel or deposit chamber $k$, and travels down a chute to a collecting hopper or its equivalent.

The dust separator and collector $b$ may be of any suitable form. The control valves $e$ and $f$ may be utilized to regulate the air currents from the double fan and to assist in producing the required air pressure. The dust outlet of the dust collector is most conveniently arranged to be at an air pressure closely approximating to atmospheric, but the side channel or deposit chamber $k$ in which the light grains are collected may be at a lower air pressure.

The air from the separator $b$ passes by way of the conduit $m$ into the vertical conduit $q$ from which it can be directed by the valve $o$ wholly into the side channel or deposit chamber $k$ to assist in cleaning the light grain or separating dust therefrom, or wholly into the channel $i$ to assist in cleaning the main body of grain. Alternatively, the said air may be directed partly into $k$ and partly into $i$.

By arranging that the delivery of the air from the dust separator $b$ takes place after the main air from $c$ has acted upon the grain, I am enabled to obtain a low air pressure within the dust separator and so dispense with self-sealing valves on the dust delivery connection thereof which can lead to a plain bag serving for dust collecting purposes.

Figure 1:
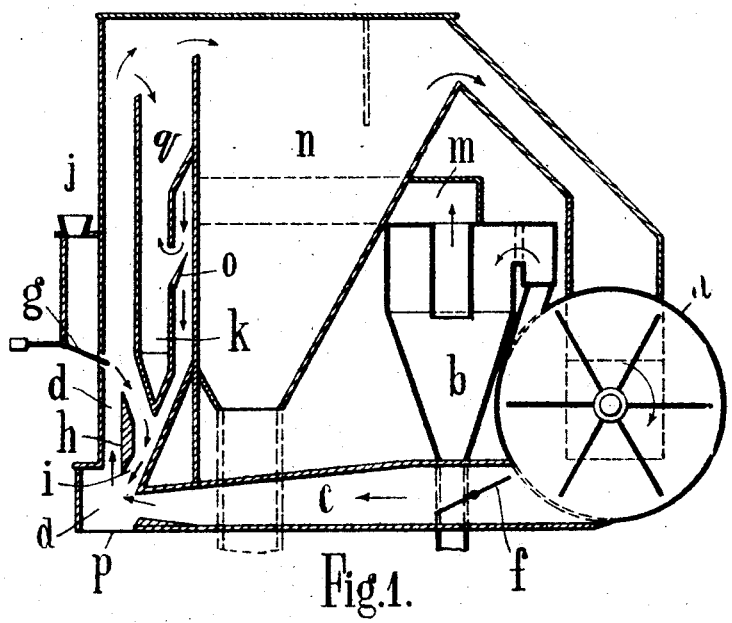
Figure 1 is a diagrammatic sectional elevation and Figure 2 a plan view of one convenient arrangement of plant in accordance with my invention.

In the Figure 1 arrangement, the dust laden air passes through a second separator $n$ before entering the fan $a$. The pressure in $n$ will be at or below atmospheric pressure so that a plain outlet can serve for dust removal purposes thereon.

It will be understood that, if desired, the air (which is small in volume) from the dust separator $b$ or a part of such air may be taken directly into the suction inlet of the double fan $a$ without passing through the grain.

I claim—

1. In grain cleaning machines, the combination wth an air circulating circuit including a double fan whereby the air after being drawn through the grain passing through the machine is divided into two portions, said portions being respectively heavily and lightly laden with the grain dust and impurities, including also a dust separator and collector through which the heavily laden air is bye-passed, or means whereby the air leaving the said separator and collector is returned to the said air circulating circuit at a position between the place of admission of the grain to the machine and the suction inlet of said fan.

2. In grain cleaning machines as claimed in claim 1, means whereby the grain is caused to pass twice through the air delivered directly from the said fan and at a point between the said two passages to pass also through air delivered by way of the said separator and collector.

3. In grain cleaning machines as claimed in claim 1, means whereby air from the said separator and collector is utilized to exert a supplementary cleaning effect on the light grain separated from the heavier grain by the action of the circulating air in said circuit.

4. In grain cleaning machines as claimed in claim 1, means whereby the air from the said separator and collector is divided into two portions, of which one is formed through the light grain separated from the heavier grain by the action of the circulating air in said circuit.

5. In grain cleaning machines as claimed in claim 1, means for the separation and collection of dust and impurities from the circulating air after the said air has passed through the grain and prior to its entering the said fan.

In testimony whereof I have signed my name to this specification.

CECIL BENTHAM.